United States Patent

[11] 3,630,669

| [72] | Inventors | Akira Naito;<br>Shigeo Oosawa, both of Tokyo, Japan |
|---|---|---|
| [21] | Appl. No. | 784,481 |
| [22] | Filed | Dec. 17, 1968 |
| [45] | Patented | Dec. 28, 1971 |
| [73] | Assignee | Mitsubishi Edogawa Kagaku Kabushiki Kaisha<br>Tokyo, Japan |
| [32] | Priority | Dec. 26, 1967 |
| [33] | | Japan |
| [31] | | 42/82957 |

[54] PROCESS FOR REMOVING IMPURITIES IN THE LIQUID OF ZINC REFINING BY WET METHOD
5 Claims, No Drawings

| [52] | U.S. Cl. | 23/125 |
|---|---|---|
| [51] | Int. Cl. | C01g 9/06 |
| [50] | Field of Search | 23/125;<br>204/119; 75/120 |

[56] References Cited
UNITED STATES PATENTS

| 1,832,329 | 11/1931 | Seguine, Jr. | 23/125 X |
|---|---|---|---|
| 1,921,773 | 8/1933 | Petschow | 23/125 |
| 1,973,300 | 9/1934 | Thompson, Jr. | 23/125 |
| 2,369,270 | 2/1945 | Waddell | 23/125 X |
| 2,145,816 | 1/1939 | Stoops | 23/125 X |
| 2,620,261 | 12/1952 | Toxby | 23/200 |
| 3,262,755 | 7/1966 | Steinmetz et al. | 23/200 |

Primary Examiner—Oscar R. Vertiz
Assistant Examiner—G. O. Peters
Attorney—Ward, McElhannon, Brooks & Fitzpatrick ABSTRACT: Impurities in the liquid of zinc refining by wet method are removed by treating a solution containing zinc with metallic zinc and removing precipitate thereby formed, thereafter adding to the solution hydrogen peroxide in an amount sufficient to oxidize ferrous iron contained in the solution to ferric iron.

PROCESS FOR REMOVING IMPURITIES IN THE LIQUID OF ZINC REFINING BY WET METHOD

The present invention relates to a process for removing impurities in the liquid of zinc refining by wet method. More particularly it relates to a process for removing iron in the liquid to be subjected to electrolytic refining of zinc.

In a usual process for refining zinc by wet method, a zinc ore such as zinc blend is calcined so that zinc contained such as zinc sulfide is converted into zinc oxide, then the oxide is dissolved with sulfuric acid and the resulting zinc sulfate solution is subjected to electrolysis to form zinc metal.

In the zinc sulfate solution there is usually contained impurities which were originally existing in zinc ore such as copper, iron, lead, manganese, nickel, cadmium, and cobalt. These impurities not only cause the lowering of the purity of refined zinc but also lower the hydrogen overvoltage at the cathode thereby lowering markedly the efficiency of electrodeposition of zinc.

Therefore, it is required to remove these impurities before subjecting the solution to electrolysis. Of the impurities, lead precipitates as lead sulfate and is easily removed by filtration. Iron is found as ferrous and ferric ions in the solution and it is removed as ferric hydroxide after ferrous ion is oxidized to ferric state with proper oxidizing agent by increasing the pH of the solution to 4 or above. Other impurities namely, copper, nickel, cadmium, cobalt, etc. are usually removed by precipitation with the addition of zinc dust. As the agent for oxidizing ferrous ion to ferric ion, potassium permanganate has generally been employed.

However, following disadvantages are observed by the employment of potassium permanganate for purifying the zinc containing electrolyte. The use of permanganate introduces potassium and manganese ions as additional impurities into the solution which accumulate after repeated use of the solution and lower the purity of refined zinc and deteriorate electrolysis efficiency. Also, manganese ion in the solution is oxidized to manganese dioxide by electrolysis and apt to be precipitated on the anode as a scalelike deposit. This brings about the rise of voltage between electrodes and deteriorates considerably current efficiency. In addition, when such scalelike manganese dioxide deposit is detached at a time short circuit may be formed between electrodes which sometimes cause serious accidents.

Hydrogen peroxide is considered to be an oxidizing agent without the above disadvantages, because there is no impurity introduced into the solution when hydrogen peroxide is employed, as the decomposition products of hydrogen peroxide are only water and oxygen. However, the use of hydrogen peroxide for the purification of the electrolyte also is not without problem. In the heretofore known method to employ hydrogen peroxide in place of permanganate for oxidizing ferrous ion, the amount of hydrogen peroxide required to completely oxidize ferrous ion was two to three times as great as theoretical requirement. In other words the efficiency of $H_2O_2$ utilization was only 30-50 percent, and it was difficult to employ hydrogen peroxide on an industrial scale from the economical point of view.

It has now been found that the low efficiency is ascribed to the existence of such ions as copper and cadmium, and that when the sequence of treatment is changed and the zinc sulfate solution resulting from the dissolution of calcined zinc ore with sulfuric acid is first treated with zinc dust and thereafter is added with hydrogen peroxide, the oxidation efficiency can be greatly improved.

In the present invention, the zinc sulfate solution is contacted first with metallic zinc preferably in a powdery form e.g., zinc dust, and the precipitates resulting thereby are removed by a suitable method such as filtration or decantation. Thereafter hydrogen peroxide is added to the solution to oxidize ferrous ion and then the pH of the solution is adjusted to 4 or above, and ferric hydroxide precipitated is removed by a suitable method such as filtration, decantation or any other known method. In the present invention the amount of hydrogen peroxide required for completely oxidizing ferrous ion is from 100 to 120 percent of theoretical requirement.

The amount of metallic zinc to be employed in the present invention should be at least the theoretical requirement to precipitate said hindering ions by the difference of ionization potential. However, the excess of zinc does not cause any obstacle either in the removal of hindering ions nor in the removal of iron and is preferable to complete the precipitation of cadmium and copper ions. The removal of cadmium and copper ions is satisfactorily carried out at room temperature.

As to the form of metallic zinc to be contacted with the solution, there is no restriction, however a fine powder such as zinc dust is preferred over a metal block, because by using a fine powder of metallic zinc smoother dissolution of zinc and faster precipitation of such ions as cadmium and copper are effected.

The concentration of hydrogen peroxide to be added to the zinc sulfate solution may be preferably low in regard to the thorough mixing of $H_2O_2$ and the zinc solution, however, when hydrogen peroxide concentration is excessively low, the zinc solution may be diluted to such an extent that the electrolysis with the solution may not be economical. Practical range of hydrogen peroxide concentration therefore is from 1 to 50 percent and the preferable range is from 5 to 35 percent. When sufficient stirring is performed at the time of $H_2O_2$ addition hydrogen peroxide utilization efficiency is increased. As to the reaction temperature of hydrogen peroxide oxidation there is no restriction, but when the temperature is very high there may arise the self-decomposition of hydrogen peroxide and hence 60° C. or below is practical.

EXAMPLE 1

To a solution containing 8 percent of $Zn^{++}$, 0.5 percent of $Mn^{++}$, 0.35 percent of $Cu^{++}$, 0.16 percent of $Fe^{++}$ and 0.04 percent of $Cd^{++}$ was added a sufficient amount of zinc dust to remove copper and cadmium at a room temperature, and the resulting precipitates were removed by filtration. The filtrate was separated into several equally divided portions and to each portion of the solution 35 percent hydrogen peroxide was added at a rate of 1 ml./7.5 min. at 50° C. The amount of hydrogen peroxide added was changed by each portion of the solution. After the addition of $H_2O_2$, each solution was let stand for 1 hour in a water bath of 50° C. Then the solution was added with caustic soda to adjust the pH to 4. Ferric hydroxide precipitates formed were filtered and the amount of iron contained in each precipitate was measured. Thus the amount of hydrogen peroxide required to completely remove the iron contained in the original solution was found to be 115-120 percent of theoretical requirement.

EXAMPLE 2

Example 1 was followed, but instead of 35 percent $H_2O_2$, 1 percent $H_2O_2$ was employed. The amount of hydrogen peroxide required for the complete removal of iron was 100-105 percent of theoretical requirement.

EXAMPLE 3

Example 1 was followed without the zinc dust treatment. The amount of hydrogen peroxide required for the complete removal of iron was 200-300 percent of theoretical requirement.

EXAMPLE 4

Example 2 was followed but without the zinc dust treatment. The amount of hydrogen peroxide required for the complete removal of iron was 150-200 percent of theoretical requirement.

What we claim is:

1. A process for removing impurities in a zinc sulfate solution obtained by leaching calcined zinc ores with sulfuric acid which comprises treating said solution with metallic zinc and removing precipitates thereby formed, thereafter adding to the solution hydrogen peroxide in an amount sufficient to oxidize ferrous iron contained in the solution to ferric iron, thereafter adjusting the pH of the solution to 4 or above and removing precipitate thereby formed.

2. A process according to claim 1 wherein the hydrogen peroxide is added in the form of an aqueous solution, the concentration of hydrogen peroxide in the aqueous solution being from 1 to 50 percent by weight.

3. A process according to claim 2 wherein the concentration of hydrogen peroxide is from 5 to 35 percent by weight.

4. A process according to claim 1 wherein said treating is carried out at a temperature of up to 60° C.

5. A process according to claim 1 wherein the pH is adjusted to 4 or above by the addition of caustic soda.

* * * * *